United States Patent [19]
Roemer et al.

[11] Patent Number: 5,702,211
[45] Date of Patent: Dec. 30, 1997

[54] CUTTING TOOL COOLANT DEVICE

[76] Inventors: David J. Roemer, 7481 Zurich Rd., Lyons, N.Y. 14489; Scott Johnson, 1819 Eddy Rd., Walworth, N.Y. 14568

[21] Appl. No.: 657,325

[22] Filed: Jun. 3, 1996

[51] Int. Cl.$^6$ ..................................... B23B 51/06
[52] U.S. Cl. ............... 408/56; 408/238; 408/239 R; 279/20
[58] Field of Search ............... 279/20; 408/56, 408/57, 238, 239 R, 239 A

[56] References Cited

U.S. PATENT DOCUMENTS

| | | | |
|---|---|---|---|
| 1,831,530 | 11/1931 | Goldsmith | 279/20 |
| 2,933,321 | 4/1960 | Cascone | 408/57 X |
| 3,443,819 | 5/1969 | Benjamin et al. | 279/20 |
| 3,905,609 | 9/1975 | Sussman | 279/20 |
| 4,740,116 | 4/1988 | Wellach | 279/20 X |

FOREIGN PATENT DOCUMENTS

| | | | |
|---|---|---|---|
| 0015248 | 9/1980 | European Pat. Off. | 408/57 |
| 3504501 | 9/1986 | Germany | 408/238 |
| 003512890 | 10/1986 | Germany | 408/56 |
| 988580 | 4/1965 | United Kingdom | 408/57 |

*Primary Examiner*—Daniel W. Howell
*Assistant Examiner*—Henry W. H. Tsai
*Attorney, Agent, or Firm*—Robert J. Bird

[57] ABSTRACT

A tool holder includes a body with a central internal threaded section, and a coolant coupling device within the tool holder. The coolant coupling device includes a threaded body section to engage the internal threads of the tool holder, a smaller diameter nose section, and a coolant passage through the device to align with a coolant passage in a cutting tool. A sealing ring around the end of the coolant passage forms a seal when the coolant coupling device abuts against a tool shank. The body section includes a wrench slot by which to turn the device for axial movement within the tool holder.

2 Claims, 2 Drawing Sheets

CUTTING TOOL COOLANT DEVICE

FIELD OF THE INVENTION

This invention relates to cooling of cutting tools, and more particularly to a cutting tool holder with provision for improved flow of coolant fluid.

BACKGROUND AND INFORMATION DISCLOSURE

Machining processes such as drilling and milling are generally done with cutting fluid on the work area. Cutting fluid lubricates the area of contact of tool and workpiece, it prevents adhesion of chip particles to the tool and workpiece, and it cools the tool and workpiece.

Cutting fluid, or coolant, at one time simply flowed onto the work area, at zero pressure, from a coolant outlet tube near the cutting tool. Some cutting tools now include internal coolant channels to convey coolant under pressure to the immediate area of contact of tool and workpiece.

A drill is an example of such a cutting tool, and will be used in the following description of the invention. It will be understood that the invention is not limited to use with drills.

The relevant prior art that we know about is as follows: a tool holder includes a tapered and threaded axial passage for a collet which, in turn, holds a drill shank. A collet nut on the end of the tool holder bears against the collet to move it axially within the tapered tool holder, thereby to tighten or release the collet grip on the drill shank. A washer with an O-ring seal on its inner circumference is seated in the face of the collet nut and secured by a snap ring. The washer and O-ring seal fit snugly around the drill shank. Coolant is piped into the tool holder under pressure, for delivery through the shank of the drill to the work area. The O-ring seal contains coolant within the tool holder.

A potential problem with this arrangement is that these systems operate at pressures of 1300 psi and higher, and the internal cavity of the tool holder is filled with coolant. It is an object of this invention to confine this high pressure coolant to a much smaller volume.

Another problem with the present state of the art is that the washer and O-ring must match the drill shank, so a collet nut is required for each drill size. In this invention, the sealing member is used with as many shank sizes as the tool holder will hold.

SUMMARY OF THE INVENTION

A tool holder according to this invention includes a body with a central internal threaded section, and a coolant coupling device within the tool holder. The coolant coupling device includes a threaded body section to engage the internal threads of the tool holder, a smaller diameter nose section, and a coolant passage through the device to align with a coolant passage in a cutting tool. A sealing ring around the end of the coolant passage forms a seal when the coolant coupling device abuts against a tool shank. The body section includes a wrench slot by which to turn the device for axial movement within the tool holder.

DRAWING

DESCRIPTION

Figure 1:
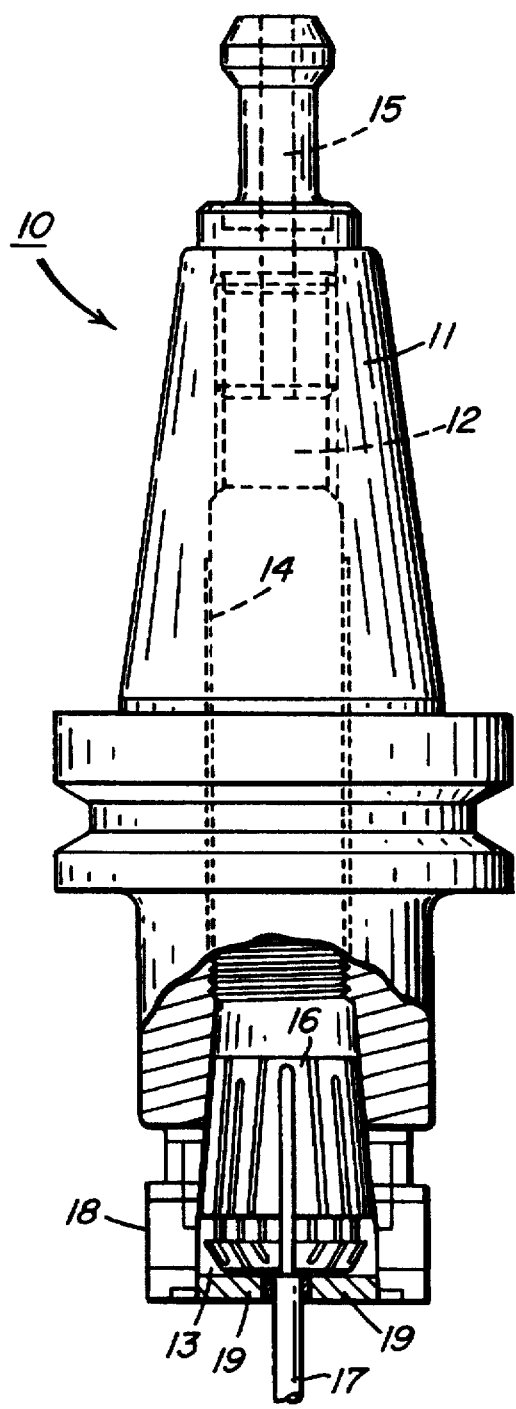
FIG. 1 is a partial sectional view representing a tool holder, collet, and drill shank according to the prior art.

Referring to FIG. 1, a tool holder 10 includes a body 11 with an axial passage 12 from end to end. The axial passage 12 includes a conical section 13 at one end, a central threaded section 14, and an aperture 15 at the other end. The external configuration and features of the tool holder are not relevant to this invention and need not be described.

A slotted collet chuck 16 in the conical section 13 of the tool holder 10 engages the shank 17 of a drill or other cutting tool. The tool shank 17 includes an axial coolant channel, not shown, to convey coolant fluid to the working end of the tool. A collet nut 18 on the end of the tool holder 10 bears against the collet 16 to move it axially along the conical section 13 to grip or release the tool shank 17. A washer 19 with an O-ring seal on its inner circumference is seated in the inner face of the collet nut and secured by a snap ring. The washer and O-ring seal fit around the drill shank 17. Coolant is piped through the end aperture 15 into the axial passage of the tool holder under pressure, for delivery through the shank 17 of the drill to the work area. The system just described is typical of the prior art.

Figure 2:
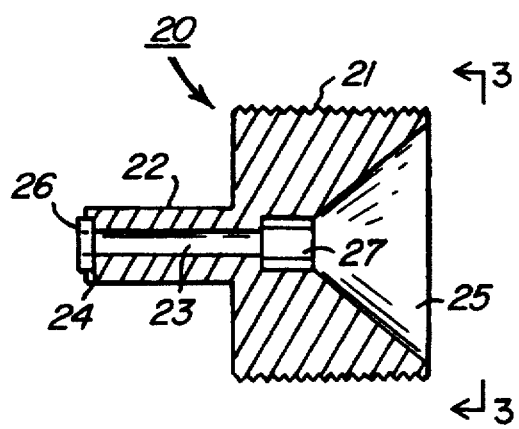
FIG. 2 is a side sectional view of the coolant coupling device of this invention.
Figure 3:
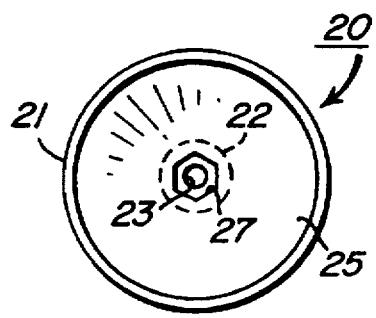
FIG. 3 is an axial view from the right end of FIG. 2.

In FIGS. 2 and 3, our coolant coupling device 20 is a stepped cylinder, including a body section 21 of larger diameter, and a nose section 22 of smaller diameter. The body section 21 is threaded to engage the internal threaded section 14 of the work holder 10. The nose section 22 is smaller in diameter than the shank 17 of the cutting tool.

The device 20 includes an axial coolant passage 23 extending through it. The coolant passage 23 includes a counterbore 24 in the nose section 22, and a chamfer 25 in the body section 21. The counterbore 24 is a seat for a sealing ring 26. The base of the chamfer 25 includes a hexagonal slot 27 for an allen wrench.

Figure 4:
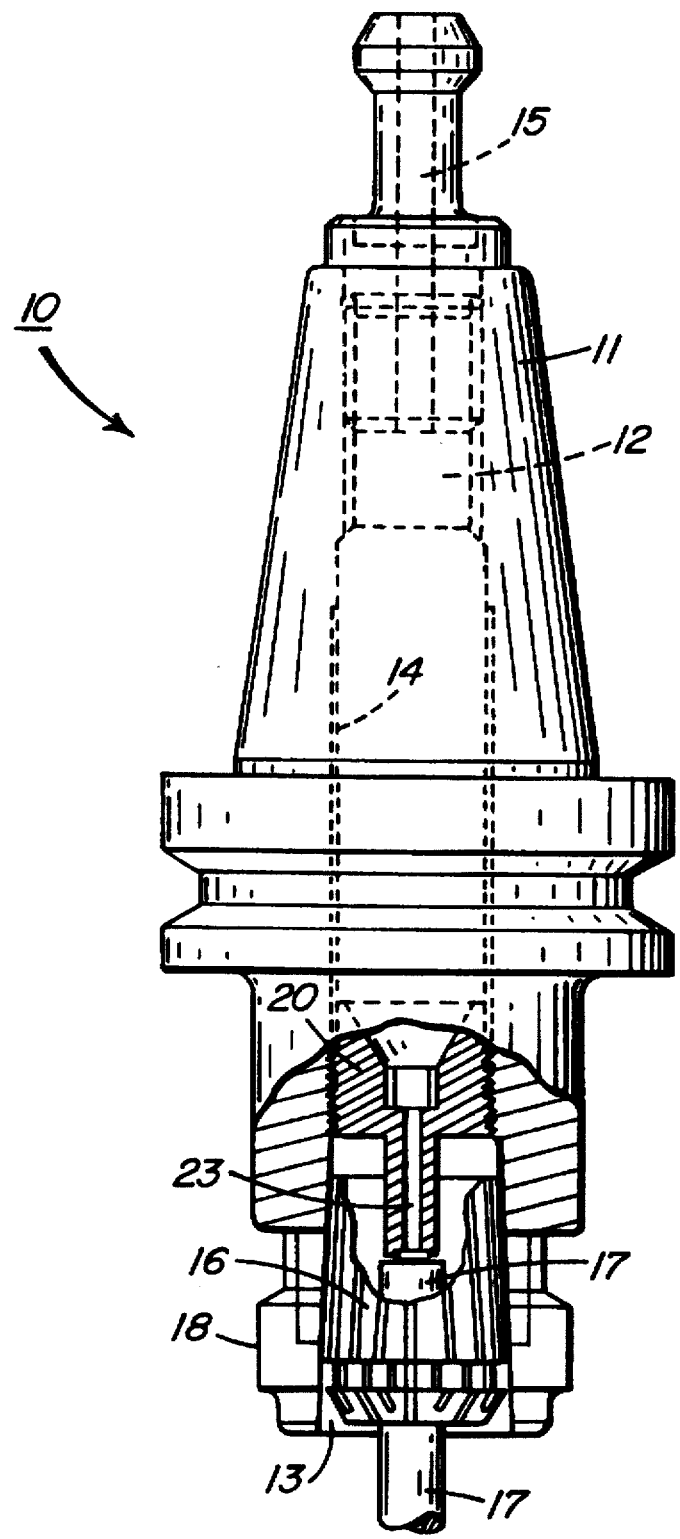
FIG. 4 is similar to FIG. 1, with the addition of our coolant coupling device.

FIG. 4 shows the coolant coupling device 20 in place in the tool holder 10. The device is assembled and operated as follows. First, the collet nut 18 and collet 16 are removed, and the coolant coupling device 20 is threaded into the tool holder. The collet 16 with tool shank 17 is then put back in place and secured in the tool holder by the collet nut 18; as shown. The coolant coupling device 20, with its nose section 22 directed at the tool shank 17, is tightened against the tool shank by an alien wrench through the end aperture 15 in the tool holder 10. The seal 26 on the nose section 22 forms a seal with the tool shank 17 to confine coolant flow to the drill shank.

This invention confines the high pressure coolant to small volumes, i.e. the coolant passages in the coolant coupling device and the tool shank.

This invention also permits the use of a single coolant coupling device in the tool holder. It obviates the need for a different collet nut for each size of tool shank.

The foregoing description of a preferred embodiment of this invention: including any dimensions, angles, or proportions, is intended as illustrative. The concept and scope of the invention are limited only by the following claims and equivalents thereof.

What is claimed is:

1. A tool holder including a body with an axial through passage having a central internal threaded section, and a coolant coupling device, said coolant coupling device including: a threaded body section to engage said internal threaded section of said tool holder, and a nose section of smaller diameter than said body section; said body and nose sections together defining a coolant passage therethrough, said passage including a counterbore at the end thereof in said nose section and a chamfer at the end thereof in said body section; a sealing ring disposed in said counterbore; and a slot at the base of said chamfer for engagement with a tool to turn said coolant coupling device for axial movement thereof within said tool holder.

2. A tool holder defining an internally threaded through passage, and including a coolant coupling device within said passage;

said coolant coupling device defining a coolant passage therethrough and including a threaded body section for threaded engagement within said passage, and a nose section of smaller diameter than said body section;

said nose section including a sealing ring around one outer end of said coolant passage;

said body section including a slot for engagement by a tool to turn said body section for axial movement thereof within said tool holder, said coolant passage in said body section having a funnelled opening to guide said tool into said slot.

* * * * *